United States Patent
Spencer et al.

(10) Patent No.: US 10,503,822 B1
(45) Date of Patent: Dec. 10, 2019

(54) APPLICATION TRACKING, AUDITING AND COLLABORATION SYSTEMS AND METHODS

(71) Applicant: APPARITY, LLC, Atlanta, GA (US)

(72) Inventors: Gavin Spencer, Wake Forest, NC (US); Subash Kalbarga, Bellevue, WA (US); Clark Gilder, Atlanta, GA (US)

(73) Assignee: Apparity, LLC, Atlanta, GA (US)

( * ) Notice: Subject to any disclaimer, the term of this patent is extended or adjusted under 35 U.S.C. 154(b) by 70 days.

(21) Appl. No.: 13/782,260

(22) Filed: Mar. 1, 2013

Related U.S. Application Data

(60) Provisional application No. 61/606,076, filed on Mar. 2, 2012.

(51) Int. Cl.
G06F 17/20 (2006.01)
G06F 17/24 (2006.01)

(52) U.S. Cl.
CPC .................................. G06F 17/246 (2013.01)

(58) Field of Classification Search
CPC ... G06F 17/241; G06F 17/242; G06F 17/2247
See application file for complete search history.

(56) References Cited

U.S. PATENT DOCUMENTS

| | | | |
|---|---|---|---|
| 5,806,078 A * | 9/1998 | Hug | G06F 17/2288 707/999.202 |
| 6,993,710 B1 * | 1/2006 | Coad et al. | 715/202 |
| 2002/0129054 A1 * | 9/2002 | Ferguson | H04L 29/06 715/212 |
| 2004/0049730 A1 * | 3/2004 | Ishizaka | G06F 17/246 715/213 |
| 2004/0181378 A1 * | 9/2004 | Gilmore | 703/6 |
| 2007/0011211 A1 * | 1/2007 | Reeves | G06F 17/2211 |
| 2007/0219956 A1 * | 9/2007 | Milton | G06F 17/246 |
| 2007/0256084 A1 * | 11/2007 | Rapp et al. | 719/320 |
| 2009/0064101 A1 * | 3/2009 | Boss et al. | 717/113 |
| 2010/0131940 A1 * | 5/2010 | Jazdzewski | 717/170 |
| 2010/0306682 A1 * | 12/2010 | Williamson | G06Q 10/10 715/764 |
| 2011/0143720 A1 * | 6/2011 | Sanjeev | 455/412.2 |
| 2012/0210251 A1 * | 8/2012 | Abrams | G06Q 10/06 715/753 |

OTHER PUBLICATIONS

Fuller et al., "The Design of an Object-Oriented Collaborative Spreadsheet with Version Control and History Management," Proceedings of the 1993 ACM/SIGAPP (1993).*

* cited by examiner

*Primary Examiner* — Shahid K Khan
(74) *Attorney, Agent, or Firm* — Smith Gambrell & Russell LLP

(57) ABSTRACT

An application data tracking, auditing and collaboration system and method are provided. The system and method may be used to track and manage spreadsheets, or similar documents, at the internal or grid level and allow for unlimited linking, consolidation, referrals, and lookups, or integration of any number of spreadsheets across any number of users across any level of security and deployment scenarios.

23 Claims, 5 Drawing Sheets

APPLICATION TRACKING, AUDITING AND COLLABORATION SYSTEMS AND METHODS

CROSS-REFERENCE TO RELATED APPLICATION

This patent application claims the benefit of U.S. Provisional Application No. 61/606,076, filed Mar. 2, 2012, and entitled "Application Data Tracking, Auditing and Collaboration Systems and Methods", which is hereby incorporated by reference in its entirety.

BACKGROUND OF THE INVENTION

The present invention provides the ability to track, audit, verify and manage, or control, application level data produced by various types of software applications in common use today. While the primary focus of this application (and the most common usage) is centered on verification and tracking of data directly related to spreadsheet applications, it should be apparent to one of ordinary skill in the art that this same approach may be utilized or extended to any application data input/output process. This technique is generally described to be useful where the users, management or administrators of the software application or business process desire to provide more control over the data creation and output utilization process.

Spreadsheets are a type of software application (or application process, engine or virtual machine) that use a grid like metaphor (columns and rows) to organize, arrange and process data and algorithms (for example, formulae).

Spreadsheets make it easy to manipulate and display information by allowing people to create formulas which depend on and operate on the data to generate new or resulting data values.

For example, a graphical spreadsheet program may have a visual toolbar area on the screen which contains a particular user interface icon that symbolizes inserting a formula into a cell (the intersection of a column and row) which will sum up numbers that are contained within a given or specified range of cells within a specified spreadsheet.

A modern spreadsheet file consists of multiple worksheets that make up one workbook, with each file being one workbook. A cell on one sheet is capable of referencing cells on other, different sheets, whether within the same workbook or even, in some cases, from within different workbooks.

A spreadsheet application is typically one of four or five main component applications of an office productivity suite (such as OpenOffice or Microsoft Office). Such suites group a spreadsheet application (such as OpenOffice Calc or Microsoft Office Excel) with a word processor, a presentation program, and a database management system (and, optionally, various other related applications) into a solution stack that aids the productivity of most office work; from administrative tasks, to sales, manufacturing, warehousing, engineering, R&D, accounting and general management among other business work or job roles.

However, usage of spreadsheets is not limited to business environments, as general users or 'home' users also make extensive use of spreadsheets to manage and track personal data such as budgets, lists of names and addresses as well as a variety of other models for financial, personal or general productivity tasks that they wish to manage and automate by using spreadsheets.

In short, given their ubiquitous and universally accepted utility in both the business and personal, home, domain, spreadsheets are generally recognized as being the most powerful, flexible and capable type software application available to all software users. Historically, spreadsheets developed as computerized simulations of paper accounting worksheets. They immediately boosted productivity because of their ability to accurately and reliably re-calculate an entire worksheet automatically after a change to a single cell is made. (This was a manual and error prone process in the days of paper ledgers). Spreadsheets have now replaced paper-based systems throughout the business world and thus created a huge competitive disadvantage in any organization or user that suffered from an inability to work with spreadsheet applications. Moreover, although spreadsheets were first developed for accounting or bookkeeping tasks, they now are used extensively in any context where tabular lists are built, sorted, manipulated and shared and also in any type of business such as, but not limited to the financial services industry, manufacturing, retail and healthcare The extensive user adoption of the spreadsheet and spreadsheet application has been found in academia, science, research & development, within marketing and sales organizations as well as most other general business tasks including those undertaken by small and medium business users, home users, groups and individuals who wish to track, organize and manage their own data.

The first electronic spreadsheet on a PC or microcomputer was called 'VisiCalc'. By 1984 Lotus 1-2-3 was the leading spreadsheet application (when DOS was the dominant operating system) that was based on and built for the IBM PC standard. By the early 1990's, however Microsoft's Excel had overtaken Lotus 1-2-3 and earned the largest market share on the Windows and Macintosh platforms; a market dominance which continues to the present day.

One of the unique ways in which Microsoft overtook and surpassed Lotus as the dominate spreadsheet product was their focus on data file migration and macro compatibility when moving users from Lotus to Excel. Allowing Microsoft Excel to read and write (or save) Lotus 1-2-3 files allowed Lotus users to seamlessly move to or from Excel. Further, because of Excel's support of the Lotus 1-2-3 spreadsheet files, the Microsoft Excel application was able to ensure interoperability within and between groups of users who shared common applications or financial and other business models built within these spreadsheets. Additionally, by supporting the ability to run or interpret Lotus macros within Excel, Microsoft was able to support the complex financial and business models built within Lotus 1-2-3 spreadsheets and eliminate most user objections to moving from Lotus 1-2-3 to a different spreadsheet application such as Microsoft Excel.

These same types of problems around interoperability and ease of use are now being faced by web based application vendors as they attempt to gain market share from the established PC based office applications, and specifically in respect to spreadsheet applications. This is most notable with the transition of traditional PC based Microsoft Excel application users to the use of newer cloud computing based application models.

Since the advent of web services and web applications, office productivity suites now exist in web-application form, with Google Docs and Microsoft Office 365 being the biggest competitors in this space. Thus, Google spreadsheets, (part of the Google Docs productivity suite) now shares the spreadsheet market with Excel. However, as 'cloud' based computing gradually replaces desktop centric computing, the unique benefits of 'on PC' or the local (PC) based processing of application data and functions remain very much in demand. The ability to rapidly process and manipulate large volumes of data and functions is both needed and heavily utilized by spreadsheet applications. As such desktop (PC) based spreadsheet applications provide a reliable and trusted solution to the processing needs of all spreadsheet users—a solution that cannot easily be replicated and/or exploited via cloud based solutions. Given the demand for both web based cloud office productivity applications and traditional PC based office productivity applications, spreadsheet application users who want the best of both the cloud and PC (desktop) world are now waiting for a new type of solution.

This new type of solution must provide seamless interoperability between cloud based spreadsheet applications and PC based spreadsheet applications as well as the ability to support the complex modeling and processing needs of spreadsheets users. This new type of solution must therefore address the problem of user and data file migration between the desktop and cloud based spreadsheets and thus the ability to support all the data and/or content stored in those files as well as all the complexity found in the models built within the files.

In addition, given the emergent nature of the cloud computing web based application model, there now exists a need to better understand how to effectively meet the needs of the traditional, desktop based, spreadsheet user in this new cloud based environment. The design and delivery of both cloud and desktop based spreadsheet applications would therefore benefit from a deeper understanding or 'instrumentation' of desktop spreadsheet user behavior and how that user behavior would change when users 'interoperate' with a web cloud based spreadsheet application.

Beyond their mathematical prowess, spreadsheets allow information (data values, data records or rows) to be sorted, organized, filtered and reported on in a manner similar to database software. While spreadsheets share many principles and traits of databases, they are not the same thing. A spreadsheet is essentially just one table, whereas a database is a collection of many tables with machine-readable semantic relationships between them. Spreadsheets are often imported into databases to become tables within them. While it is true that a workbook that contains two or more worksheets is indeed a file containing multiple tables that can interact with each other, it lacks the relational structure of a database and may also lack the enormous storage capacity of an enterprise database application. Thus spreadsheets may store data but are more adept at utilizing or leveraging that data by storing it into cells along with associated algorithms such as, but not limited to, formulas and linked lookup tables.

PC based spreadsheets share many application features or functional commonalities with other PC software based products such as word processing, databases and presentation applications. Commonly, these applications, including spreadsheets, store their internal application data or data structures in computer file system structures on disk drives, whether on the local PC drive(s) or the local area network (LAN) or the Internet/web-services/cloud services type infrastructure platforms. Regardless of where the file is stored, the basic concept is that the software application has a structured or well-defined proprietary file format that it uses to store on disk the internal data structures, values and elements that it needs to create the software product application 'file' in memory as the user works with the application. When the application starts, it reads the file structure to load relevant and necessary data into working memory and then allows the user to interact with the functionality it provides (document editing, creation, calculation, etc.) and as requested or configured will store either temporary/intermediate results of this user interaction and or the final/permanent results to the file on a file or disk structure. Thus, spreadsheets can have a proprietary file format that stores the grid data and or content. Moreover, this static 'document centric' or file and folder model of working with spreadsheet files has been the dominant way users interacted with their spreadsheets.

Additionally, most PC apps can read and write alternative file formats including formats defined by their competitors as well as industry standard or common data interchange data formats such as CSV or XML among others. These common formats may or may not lose application 'fidelity' (that is the unique features, formatting or metadata knowledge that the creating application knows about the file) when the file is expressed or written to disk in a competitors format or in an industry standard format. Any loss of 'fidelity' is typically acceptable as users are only seeking to move the 'data' values and not the formatting from one app to another. The concept of data exchange and interchange is well known in the PC software industry and there are many standards bodies and industry working groups among many other initiatives that frequently seek to define a standard file format and to encourage data exchange or interoperability between software applications.

A unique source of well recognized challenges in the management and control of the use of spreadsheets is created by the powerful native or built in functionality available to spreadsheet users providing them with the ability to literally build applications within their spreadsheets. These applications are able to perform discrete and potentially complex business or personal processes that regularly link data values and formulas across sheets or files, achieve complex data retrieval and sorting capabilities and often include macro level programs built from functionality available in modern PC based spreadsheet applications. This ability for users and businesses of all types to build and rely upon these applications (sometimes also referred to as 'models') constructed using the functionality available within a spreadsheet application has generated a dependency and a heavy usage of spreadsheets in the daily activities and operations of spreadsheet users and businesses. Moreover the 'linking' of cells and content between discrete spreadsheet files often found, for example, when a user is attempting to consolidate data held in one or more related spreadsheet files has introduced additional problems for users to address. Examples of such problems include subtle changes to data constants or calculation errors which may be introduced by users who are working with multiple "copies" of the same spreadsheet file; different "versions" or flavors of the same spreadsheet, including older versions of the spreadsheet being mistaken for the "current" or latest version; as well as the inability of administrators or professional auditors to track and consistently know who made the latest changes to a spreadsheet and how those changes have rippled throughout any linked spreadsheets or groups or sets of spreadsheets. In this respect the difficulty in accurately determining who made the last change and what was changed within any version or snapshot of a spreadsheet is a critical problem to many spreadsheet users; in particular for finance and accounting users as well as business and financial process auditors, all of whom depend on knowing what has been changed within a spreadsheet and all of its related or linked spreadsheets before they can safely make business decision and or "certify" these specific or related spreadsheets. Without being able to know who did what, when, where and possibly why, these professionals are taking on great risk in providing letters or reports stating the accuracy of their auditing and tracking work, specifically for any financial reports that are generated by linking two or more spreadsheets together. This lack of transparency or data change visibility is one of the various problems solved by the current invention.

Another challenge currently facing spreadsheet application vendors is the growth trend of users taking advantage of the development tool-like capabilities within spreadsheets to build complex mathematical, financial or business models including programming applications hosted within the spreadsheet. This usage creates the conditions for limitless complexity when systems desire to track both the spreadsheet files, the changes made to each spreadsheet as well as the impact of those changes. The impact of these changes may range from minor formatting errors, to changed, deleted or missing data or formulas, including introducing subtle errors over time, whether minor or major errors, into the models embedded within the sheets, and thus the decisions made by the users based on those models may be impacted greatly. This complexity has been driven by both the extensive linking of sheets together via cell references as well as data value exchange included in the programmatic development of these models within the spreadsheet. Further contributing to the growth of complexity is the decentralized and ubiquitous usage and distribution of spreadsheet files that are being shared via email, via USB or 'thumb-drives' and even cloud based collaboration services in various forms. As users find more ways to share their spreadsheets, more copies of the file are made outside of any controlled system or process and thus the individual PC based copies of Excel, for example, cannot track who is changing what within spreadsheet cells nor can they synchronize those changes across all users and all versions (or copies) of the spreadsheet file. This lack of transparency is potentially compounded yet again by the inability to track changes and the impact of those changes when dealing with "N" tiers or levels of 'nested' spreadsheets, (meaning two or more discrete levels that make up a typical parent/child hierarchy model) which may be linked together across any level by, for example, cell level formulas, cell references to other data sets and or sources or even shared data values. Collaboration by various members of a team that continuously create slightly and subtly modified versions of these nested spreadsheets utilizing the exact same file name and thus overwriting prior changes made by various members of the same further complicates the challenge of spreadsheet management and control.

Thus in order to audit the sophisticated and complex business applications which have been developed within spreadsheets using modern spreadsheet applications, a new set of challenges are created for those who want to know who changed what, when and where within a spreadsheet. Moreover the recent introduction of web based collaboration and file or data sharing technologies via cloud services has not offered any new solutions to the problem of managing 'N' Tiers of related spreadsheets across multiple users, but rather has introduced additional opportunities for error, version mismanagement and loss of data integrity.

The familiar, powerful and easily scalable spreadsheet usage supported by established business processes and models as well as web based collaboration systems combined with the weak capabilities of file based spreadsheets applications to record and track changes to versions across copies stored outside of the control of any centralized process makes the job of auditing, reporting and certifying any spreadsheet based business models complex and error prone given the current state of technology in use. Further the tendency of spreadsheet applications to leverage the local PC processing resources rather than that offered by web based spreadsheet applications means that desktop or PC based spreadsheets may continue to be the pre-dominant or preferred type of spreadsheet application product versus cloud-based spreadsheets. Similarly, web based spreadsheets may be viewed as being generally limited to use by casual, single table or limited sheet user scenarios. Thus the large and/or the complex and/or the highly linked spreadsheets will generally still depend on the highly accessible and comparatively powerful processing capabilities and functionality provided by local PC software products like Microsoft Excel.

The use of application data files is an established method to persisting application functionality between user sessions, between users as well as between software applications or systems. Various software products utilize the ability to read/write or store the data contained or created within the software application as a 'file' structure on an operating system file system or disk drive (or virtual drive). Many products utilize proprietary or internal only formats as their native file structure so that the file format that one software application uses, such as spreadsheets, is different from what a word processing application would utilize to store its relevant application and or user created data.

Beyond the native applications ability to store/read/write application data, the common PC desktop software applications may be commonly connected to, or integrated with, another category of software applications to enhance or extend the ability to manage the creation, processing, searching, printing, reporting, management, etc. of end user application data files via a third party centralized database application or system. These are typically classed as 'Enterprise type software systems' and are generally tied into or 'wrapped' around both the PC software application on the desktop as well as the existing internal file storage system (local disks or LAN/internal storage, SANs or networked attached storage, including cloud or big data storage models) supported by the desktop software or cloud application. These enterprise applications are generally known as 'Enterprise Document Management' (EDM) applications and they seek to provide enhanced value such as both file and content searching, storing multiple copies of files, reporting on file usage and content, as well as control or centralized management over both users and their data files among other features such as enhancements to the basic software application functionality including enhanced access security.

One good example in this category is the use of 'document management' software by professional or office users (such as lawyers) to manage word processing documents such as letters, contracts and memos or reports. By utilizing the EDM application to centralize the storage and control of the word processing files, the business or organization can more easily manage the cost and operation of creation, editing, printing and reporting as well as security and the control of the dissemination of the content of the word processing documents.

The idea of using an application to centrally manage 'files', whether word processing or spreadsheets or presentation graphics or the like, is well known in the industry, as is the use of newer web-centric hosted portals or internet web service applications which have been developed to extend this model of internal LAN management of documents to the newer internet models. One of the most common examples in this new internet web-centric EDM model are Microsoft's SharePoint products which utilize a webserver (either on the local area network or a web service model across the Internet) to manage and control access to Microsoft Office documents or static files including word processing, spreadsheets or presentations, among other file types.

The central theme in these types of system architectures is that the application is storing the 'file' as it exits from the creating application such as Excel and then SharePoint, or another similar application, will add some value added services around the existing file storage model, such as file access security, reporting and some level of control over a simple file based versioning system (i.e. there may be a version 1, version 2, version 3 up to version 'X' of the same file or similar but slightly modified version of a file stored as 'X' separate files in the file system). In this respect, the EDM application is typically managing access to the underlying file system via metadata stored in its internal database as users are required to open and close files using the EDM's file management user interface (UI) and not the native application UI for saving or opening files. Additionally, when EDM applications are integrated into the native application's file management UI, they typically redirect the standard or normal file open or save application programming interface (API) to read or write the proprietary format to the file storage system that is managed and controlled by the EDM.

It is important to also note that when reading or writing the proprietary format to the file storage system that is managed and controlled by the EDM, the EDM application will do this without typically altering the content of the native office application file structure. The EDM application will instead capture metadata about the file (which user is editing/changing the file, data/time of the change, file name, etc. among other properties, attributes or metadata values among other aspects tracked or managed by the EDM systems) and store that metadata into the EDM application database. The EDM typically leaves the office document file untouched and stores it outside of the EDM metadata database system. Thus the EDM app only knows what the creating application tells it about the changes made to the file or what it can see or find by inspecting the file format directly using its own internal search or storage methods.

This approach to managing documents or files by Enterprise Document Management systems and, as a function of that approach, to understanding what changes have been made to the stored document or file has however a limited knowledge of, for example, what changes may have occurred within any single cell of a spreadsheet. This could include, but not limited to, a complete understanding or knowledge of how the interactions between and among unrelated or related cells has changed. Additionally, EDM applications may have almost no capability (and therefore the ability to record the relevant knowledge) to see, track or inspect how related or linked sets of separate files have been modified, so that they interact differently either by intentional editing or unintentional side-effects or unintended editing among other visibility limitations or weaknesses.

It is the weakness of the single file inspection method, as well as the lack of knowledge available by searching the metadata, or the lack of knowledge available to the application by using metadata semantics to understand the relationship between cells, sheets and workbooks, that limits the EDM type application from accurately tracking changes across, between and among multiple files, particularly spreadsheets.

This lack of sophistication, depth of tracking and overall lack of support for 'N' tier hierarchical linking between spreadsheet type documents, for example, introduces the errors, intentional or not, which creates the critical problem of management uncertainty and doubt that is one of the focus areas of the present invention. In addition to this lack of detailed tracking of changes within standalone as well as hierarchically linked spreadsheets, the EDM architecture and model does not address the management of complex applications that can be constructed within the spreadsheet, as the EDM application may not have knowledge of the interaction between language statements or functions within the spreadsheet built application as well as the runtime behavior or interaction between spreadsheet and non-spreadsheet files, including, but not limited to the dependencies between files.

While spreadsheets (and the business applications performed by the spreadsheet and or groups of related (linked) spreadsheets) may contain one or more sophisticated algorithms built using formulas, data models, macros and even embedded programming languages, they have traditionally not been considered as full blown modern programming 'languages' or programming development environments. Yet, given how spreadsheets can be used to build complex and sophisticated solutions to many different types of critical business processes they are regularly used to automate, they should be viewed in that manner. Moreover the spreadsheet applications should be viewed as possessing the same general capabilities of a programming language and or a programming development environment when the spreadsheets application native capabilities is combined with the spreadsheet users ability to build and successfully execute business process automation. This is particularly apparent when the building and running of spreadsheet applications is regularly reliant upon such fundamental programming models/concepts as the ability to leverage native functionality to 'call' and return data or values from one or more sets of spreadsheet cells located within one or more separate spreadsheets.

Further, other complex document and or business process automation models built using other office productivity applications should be viewed in the same manner.

While spreadsheets may lack many of the more 'object-oriented' (OO) functions of modern programming languages such as C++, Java, PHP, Ruby or Microsoft's .NET based languages, they do have incredible power to treat each cell as an entire function in and of itself or as a sub-program. Thus entire worksheets, rows of cells or ranges of cells may be viewed to be complete applications rivaling traditional executable applications. Additionally, while OO capabilities are typically expressed in source code language features, the spreadsheet may expose native functions, macros or even languages such as Visual Basic for Applications (VBA) as embedded code or values within a cell. These functional expressions within one or more cells may be linked together at runtime to create full blown programs running within the context of the spreadsheet application object. Finally, the spreadsheet or other business applications may expose parts of their functionality via OO constructs such as classes or functions that are callable within a single spreadsheet cell. So while OO languages are stored as ASCII text files, when they are 'compiled' or executed they act as standalone objects, much like each cell within a spreadsheet may contain language statements and/or expose their functionality as an object callable by other cells or applications. Thus, while C++ may be used to create Microsoft's Excel, a single spreadsheet may be developed which allows Excel to expose the embedded spreadsheet code as a pseudo type function, object like class or even a standalone application, and as a consequence one spreadsheet application may call on or link to or embed objects from multiple spreadsheet files or other software applications outside of the spreadsheet engine.

Thus, to the business user, the spreadsheet may be viewed as being "the application" and the spreadsheet's UI may be the only user interface with which they interact with the functionality of the business application that they use to perform a job or task.

Thus, in some ways, the Excel 'runtime' may be viewed to perform a similar function to that of the Java runtime machine in hosting and running a Java source file or Java application. Therefore, from the point of view of the spreadsheet application builder, users and administrators among others, applying existing software development tools and techniques would seem appropriate to improve their usage and management of spreadsheets. Yet to date, these traditional software tools, methods or systems have not been applied to spreadsheet files or the management of their embedded content or applications.

What distinguishes OO languages from traditional 'linear' or modular languages (i.e. non-OO languages) is the complexity of interaction and inter-relation, linking and nesting of object levels between and among the source code language, it's native constructs and operators as well as the operational characteristics of the compiler and the operational or 'runtime' processes which host or run the software built with OO paradigms.

Object-oriented programming (OOP) is a programming paradigm using "objects"—data structures consisting of data fields and methods together with their interactions—to design applications and computer programs. Programming techniques may include features such as data abstraction, encapsulation, messaging, modularity, polymorphism, and inheritance. Many modern programming languages now support OOP. Applications may be built using various macros or programming languages such as the Visual Basic language embedded within Microsoft's Excel spreadsheet application, in order to give their users access to the powerful capabilities provided by these development tool options.

While simple, non-OOP programs may be perceived to be one "long" list of statements (or commands), OO applications are built around smaller chunks of code which encapsulate both data and the code to operate on the data—much like modern spreadsheets may do within their cell and matrix format. Traditional non-OO languages group more complex programs into smaller sections of language statements or functions or subroutines, each of which might perform a particular task. With linear designs of this sort, it is common for some of the program's data to be 'global', i.e. accessible from any part of the program. As programs grow in size and complexity, allowing any function to modify any piece of data, errors or bugs can have wide-reaching effects. In contrast, the object-oriented approach encourages the programmer to place data where it is not directly accessible by the rest of the program. Instead, the data is accessed by calling specially written functions, commonly called methods, which are either bundled in with the data or inherited from "class objects." These objects act as the intermediaries for retrieving or modifying the data they control. The programming construct that combines data with a set of methods for accessing and managing those data is called an object. The practice of using subroutines to examine or modify certain kinds of data, however, was also quite commonly used in non-OOP modular programming, well before the widespread use of object-oriented programming.

Regardless of language properties, constructs or architecture, both OO and non-OO languages are created and generally stored as simple text files following the semantics and rules of that particular programming language.

In addition to utilizing the features and attributes of programming languages used to build software applications, a traditional software source code language file may include other types of content. One example of this content are the commands or directives used to include or link one file to another language file or some other type of file required to compile or build the software application. Another type of content that is critical in managing software complexity is the use of naming conventions for variables, functions and constants among other values. These naming conventions allow other programmers to understand what the original author's intent was or to document what type of behavior occurs in the program or what type of attributes a variable or value should contain among the many motivations to document the source code. Finally, a critical content type that exists in source code language files is the use of programmer comments to document the overall design or intent of the file. These comments are ignored by the compiler or runtime engine as non-functional statements and thus do not impact the runtime behavior. While ignored, subtle errors may be introduced in software when comment delimiter values, such as /* in the C language, are removed and create conditions where one comment delimiter opens a comment area and the corresponding closing delimiter is deleted by accident and thus the compiler sees the comment as extending all the way down to the next closing delimiter. Various software tools such as Computer Aided Design (CAD) applications, source code profilers and editors as well as pre-processors and the like have been developed over the years to eliminate errors, enhance the use of, accuracy in and coordination among various programmers who work on a shared set of source code files to collaboratively create a software application.

One example of a traditional software development tool used in the management of programming language source code text files is the programmer's editor or Integrated Development Environment, (IDE)—a tool that is used to host or edit the source code language file and which may be viewed as similar to a spreadsheet as the editor for the code within its storage matrix.

Another common application programming tool is a management tool used to control the repository of the many source code files themselves as well as the content inside each source code file—this is the software category known as Source Code Management (SCM) systems. Given the complex nature of software programming and the extensive use of individual source code text files to create complex applications, the development of SCM systems occurred in order to manage the complexity of which version of a source code file was being used to create or compile a single version of the application. Versioning and change management or history tracking systems are well known to the software development industry as useful tools to manage "source code" text files, because while these files are simple expressions of a particular computer language, the interaction among and across the files to specific functions, constants or features contained within other source code files has necessitated the need to know which version of a file was used to generate a specific piece of software executable or binary code.

Typically, while programmers use "editors" to manage the source text files, these source files are read and processed by a "compiler" to generate the application binary code which is run or executed on a computer to perform the work of the software application.

In a software application there are typically many source code files (10's, 100's or even 10,000's of files) that are used to create a single software application. The complexity of managing all of the changes to these native source code language text files and the complex relationship, linking and the interaction across and among these files is yet another example of a document or file management system. In this case, while SCM may be viewed to be similar to EDM applications, they differ in many ways. Specifically "source code control" or "source code management" systems manage more than just the files which are created and edited by the programmer. SCM systems are reading, inspecting and tracking the internal changes made to the text inside of the file on a line by line or even character by character or bit or byte level, as often times a small or minor change can have enormous impact on the compiling and operation of software generated from these SCM systems. Thus, what SCM systems provide to the software development market is a solution to the more complex and detailed problem of what specifically changed within a single file and what other files depend on that file as part of the "software build" process of linking and compiling software, and therefore they may predict or warn what impact that change may have across the set of dependent files.

In addition, another common feature or need of the programming community is to track, audit and know which version of a file was used on which day to compile a specific piece of a software product or version of that software product. Thus the SCM system must know at a low and detailed level what the complete and total history of changes are for any file it manages, regardless of how small or minor they may be, or where or how they have been made to any file under the control of the SCM system. With these features, the SCM may allow a programmer to "rollback" or "roll forward" from any one version of a single (or multiple sets of) source code file to another version, or to mix and match older versions of one file with newer versions of related files to generate a targeted or desired version of a specific software executable file.

The SCM's ability to track and manage all of the complexity of the native source code text is critical to the successful process of developing the correct or targeted version of a piece of software. SCM systems may also provide required centralized security, management and reporting of source code files (or pictures or other related documents including binary documents which are embedded within a software application).

Thus, SCM systems may be viewed as specialized EDM systems but without some of the sophisticated or native office application file open/save or UI type of features. Yet the SCM systems provide far richer and more robust file versioning and tracking facilities than that offered by existing EDM applications and solve a different and more complex category of problem.

To date, the SCM model has not been applied to the PC or cloud application data or to the management of documents or file world typically managed by EDM systems.

SUMMARY OF THE INVENTION

One of the inventions described and defined by this application is the idea to treat spreadsheets not as "document editors" (i.e. word processors are document editors), but instead to treat spreadsheets as "application building tools" (i.e. spreadsheets as source code editors similar to programming tools or language tool/IDE environments) that are used to edit, manipulate and manage complex software apps or models. This concept includes the idea that spreadsheet cells, sheets or workbooks may contain embedded code that may be viewed as having OO like properties or complexity. Spreadsheet tools are used to build applications which utilize the data grid, data values, formulas and built-in or intrinsic operations or functions contained within the spreadsheet engine and expose this application functionality as cell level objects at the most basic level.

One theme of the present invention is to acknowledge that the "document centric" model of managing spreadsheets for version control and tracking is inadequate to solve the complex problem of multiple dimensions, multiple linking across multiple files and multiple users creating multiple versions among other problems or challenges facing the users and overall marketplace. Instead, this invention moves the idea of managing spreadsheet content and activity from a spreadsheet file or document centric model to one in which the spreadsheet is viewed as a container for complex sets of "source code" which are expressed as data, code, metadata or objects contained within each cell, row or column of the "grid", and to manage the content of these cells, rows or columns in a manner similar to or along with those services provided by SCM systems.

Thus by leveraging the unique capabilities of SCM system controls and tracking are you able to truly understand and manage the OO like application development potential and complexity contained within any spreadsheet.

In one embodiment, the present invention converts the older style file based system or document based model of data tracking or inspection of a file into one where the contents of a spreadsheet grid are extracted via an embedded helper object, widget or control that works natively within the spreadsheet application. The embedded tracking object allows the spreadsheet's existing data input output (or I/O) process to be wrapped or connected to a sophisticated and comprehensive spreadsheet or document management, versioning and tracking system using existing SCM like systems. The spreadsheet or application data is streamed in and out of the application using the application helper object which is connected to an SCM server which is modeled on or similar in manner to existing SCM systems, in order to solve the fundamental problem of truly tracking and understanding the complexity around the data values, formulas and general metadata contained within a spreadsheet grid source code model.

The embedded helper object ensures that the native spreadsheet I/O functionality may be intercepted and redirected to a SCM like system which then provides a versioning and collaboration system around the "grid data values" by coupling the spreadsheet engine to a data versioning system without regard to the storage structure, format or file system capabilities used by the native document file version of the spreadsheet.

Thus by moving outside of the limitations of the file system tracking methods used by traditional EDM systems, yet working natively within the spreadsheets existing UI, along with the combined or integrated nature of I/O management, the present invention is able to provide a true versioning and tracking process that enables auditors, administrators or software modelers (i.e. spreadsheet architects) to know exactly what changes were contained within any version, or a point in time snapshot of the "data model or application" which is embodied within the grid metaphor and runtime evaluation engine of modern spreadsheet applications.

It is the dynamic nature of spreadsheet based applications and their ability to interpret formulas, operate on data values (either static embedded values or dynamically generated or calculated values) contained within the spreadsheet or "model" built by the spreadsheet user or designers that turns the spreadsheet "editor" into an application building tool.

Thus the current invention's ability to track the "source code" contained within the spreadsheet grid "source model" enables a unique set of powerful and novel system features to be delivered to the market. Importantly, this same architecture can scale in multiple dimensions, both with the growth in users as well as with the growth in complexity that comes from working at both the local PC file system model as well as supporting the massively decentralized web-centric sharing or cloud collaboration models that are becoming popular. Moreover by moving outside the document or file model, the present invention enables a true and faithful, or complete, tracking procedure to occur for any change made by the user for any spreadsheet model "tracked" and managed by the SCM system process at any level of complexity at any number of users, regardless of deployment inside a company or with a community of casual or independent but jointly collaborating users working across the Internet.

A source code control or versioning system (generally SCM) tool may be used to track the development or changes that occur to a source code file. There are many reasons that users want to track the changes to a source code file, some of which include the ability to track changes or "deltas" over time, or to prevent it from being altered by more than one person at a time as well as to back up the file and allow it to be "rolled-back" or restored to earlier versions of the file. A SCM system is commonly used for projects where multiple source files are used or where multiple people are working with the same source file. SCM systems may provide coordination and services between members of a software development team including alerts, reports and error notification or even prevention as well as security and control over who may make changes or approve changes or consolidate files. At the most basic level, SCM provides file management and version control so that team members don't write over each other's changes, and only the newest versions of files are identified for use in the workspace. SCMs may also give developers the ability to work concurrently on files (in branches that may or may not converge), to merge changes with other developers' changes, to track and audit changes that were requested and made, and to track bug-fixes or related versions of the same code between releases. In some cases, SCMs may include other components to assist in managing a software process throughout the entire lifecycle. Finally, SCM systems track changes made to a file in detail, including inspecting the internal contents of a file and not depending on the application "editor" to describe or identify any changes in the file. SCMs have a native or intrinsic capability to measure, evaluate and track changes in detail and at arbitrary levels of complexity across hundreds of concurrent users across thousands of files. However, to date, SCMs have not been integrated with spreadsheets, as most native file formats for spreadsheets utilize dense, binary representations of the spreadsheet grid model and data values and thus spreadsheet files are "opaque" or not visible to SCM systems and therefore they are not used to track internal changes made to spreadsheets on a cell by cell basis.

Finally, SCMs have worked best when the source files they manage are in clear text or plain text or ASCII text formats, as any proprietary formats must have file filters which enable the SCM to inspect the details within the native application file. The solution described according to the present invention allows the helper object inserted or embedded within the source application to modify the data I/O process to redirect and control the stream of application data including cell level data for spreadsheets. The application process connects the data I/O stream to the back end services of the SCM based server to provide the complete versioning and tracking capabilities and process among other features.

Additional value added services may be applied between the application's generation of data (or source files) and the SCM backend services by inserting filters at either the application 'client' level or the 'server' level, to inspect the data stream as it is extracted from the source application and before it is inserted into the SCM storage model. These additional filters or services enable the solution to inspect 'file' contents, data values, formatting changes, formulas or other content and enforce a consistent set of rules over the data stream. This redirection of I/O and linking of the desktop application to the SCM server may be analogous to the idea of 'piping' output of one program to the input of another program such as older batch files and shell scripts which are commonly used in the administration of UNIX or Linux systems. Additionally, the new model of .NET based object pipeline scripting used by the new Windows PowerShell from Microsoft is an alternative way to compose applications by linking output of one app to the input of another by managing the data and state of the data between the apps. While these traditional scripting models have been utilized to manage PCs, servers or applications, they have not been widely applied to EDM type document management or SCM scenarios to date. The present invention may implement these concepts both locally on the PC as well as on the server to manage the application source files. Enhanced user collaboration may be supported across the Internet by utilizing web services to link the document output of one or more applications, whether based on a PC or in the cloud, to the SCM like server managing the content and backend tracking, auditing and reporting services.

Finally, in terms of treating spreadsheets as application development tools including cell level source code data, the invention may be viewed to be an 'object' like compiler, or from another point of view as a spreadsheet "rules compiler" that enables spreadsheets to be managed in a source code like manner—for example, including applying build rules and approval over file consolidation and the publishing of 'final' versions of a spreadsheet application model or report in a manner similar to how SCM systems enable collaboration between programmers or teams and the building and delivery of the final software application.

Thus the connected, filtered and managed I/O model of this invention allows a variety of powerful features to be implemented over the management, control and coordination of data or content level changes made by users connected to the system. The data filter model may be managed or extended by implementing 'rules' to determine what data values to monitor, what are the allowable set of changes to the data as well as what actions to take or prevent when prescribed or defined changes are recognized within the managed data stream. Admins or managers desiring to enforce business rules for consistency, clarity, accuracy or compliance among other reasons may configure these I/O filters and rules to monitor data as users interact with the system, and either warn users of their changes, block the changes from being saved, or 'correct' the error or undesired condition before it is stored in the SCM system. The choice of who can make the changes, who can approve the changes or even who can see the changes is an additional feature provided by this invention. The rules and enforcement of the rules may be controlled at the user, project, departmental or enterprise wide level as well as across large casual communities of users on the Internet.

Finally, combining a SCM backend server with a set of user friendly web services allows administrators to manage and control the overall behavior of the system as well as user interaction with managed files. This SCM server and web services combination would also be responsible for providing reporting, alerting and monitoring among other forms of communication and collaboration. Large web communities, including social networks or SaaS or PaaS communities, may also be supported by utilizing web services to provide change management, history, auditing and tracking of data changes from users collaboratively linked between two websites.

Another advantage of the unique design and architecture of this invention is the ability to support 'asynchronous' user interaction and a change tracking system across many decentralized users working on the same sets of spreadsheet files. Under this scenario, while multiple users may be working on the same 'version' of the file, the use of the SCM like system features to track the underlying cell level changes facilitates the system's ability to allow or enable multiple users to 'step on' or overwrite each other's changes yet not physically destroy the 'file' that is managed by the underlying SCM system. By their nature, SCM systems were designed to have multiple programmers make changes to the contents of the same file and yet allow a sophisticated administrator or 'build manager' to choose which files to use to compile the application, along with which specific functions or 'flavors' of the file, and then merge them all into one unified file. When applied to the concept of cell level spreadsheet changes, the invention allows users to work in parallel yet perceive that they are disconnected or isolated from the changes made by the other users working on the same or similar versions of the file. Utilizing some of the natural power of tracking changes and notifying administrators or concerned users (programmers) of these changes allows the present invention to enhance the collaboration and real-time experience of users sharing the same underlying spreadsheet application or models.

Administrators, auditors, managers or executive level approvers may now control which specific cell level change is accepted into the 'final' version of the 'master' spreadsheet and thus have confidence that they understand the true behavior and characteristics of the spreadsheet application or model.

Another component to the invention is its critical relevance and importance to the general business problem known as Governance, Risk and Compliance (GRC). GRC type applications are used where auditing, control and reporting over business application data is a critical component of the control and management of the business. These GRC solutions are widely used by businesses to manage and coordinate a company's response to supporting required industry or government regulations such as Sarbanes Oxley, HIPPA and other industry or general business regulations including voluntary compliance to these regulations. The primary weakness of GRC solutions is the inability to track, manage and control application level source data that is used to produce reports or data submitted or controlled by these regulations, including the critical area when spreadsheets are used as the principal data gathering, modeling and reporting tool used to produce required reports (such as SEC mandated 10Q and 10K report filings among others) that are covered by regulations.

The Sarbanes-Oxley Act of 2002 (SOX) was passed by the US Congress in reaction to a series of corporate accounting and financial reporting scandals. The act seeks to place direct responsibility and accountability on the senior executives (Chief Executive Officer or CEO, along with Chief Financial Officer or CFO among others) of a covered entity including publicly traded companies to certify that all numbers reported in financial statements are both accurate and under the control of the company. Section 404 of the Act specifies that procedures must be in place to document and produce auditable reports that demonstrate that a company has "internal controls" and processes that govern the creation, manipulation and operation over all materials, including spreadsheets, which are utilized to generate financial reports and other reporting documents. Thus, SOX compliance has become a top priority for publicly traded companies. The challenge for CPA's, consultants and auditors is that the inherent complexity and flexibility of spreadsheets to link to other spreadsheets and allow the manipulation and or consolidation of data values generates a great deal of fragility and potential for error to be introduced when constructing the material compliance documents. Thus the ability to track, audit and manage all of the spreadsheets utilized in regulated financial reporting scenarios is a critical problem to businesses in the US and all over the world today.

To date, products and technologies that have sought to solve this problem have utilized "file based" or "document based" versioning and tracking procedures, yet these existing methods have been seen to be both deficient and flawed in solving this problem. These flaws and deficiencies can be demonstrated by the reluctance (and expense) of auditors to signoff and certify reporting and internal control procedures which utilize these existing file based methods.

What is therefore needed and provided by the present invention is the ability to track and manage spreadsheets at the internal or grid level and allow for unlimited linking, consolidation, referrals, and lookups or integration of any number of spreadsheets across any number of users across any level of security and deployment scenarios.

DETAILED DESCRIPTION OF THE PRESENT INVENTION

Figure 1:
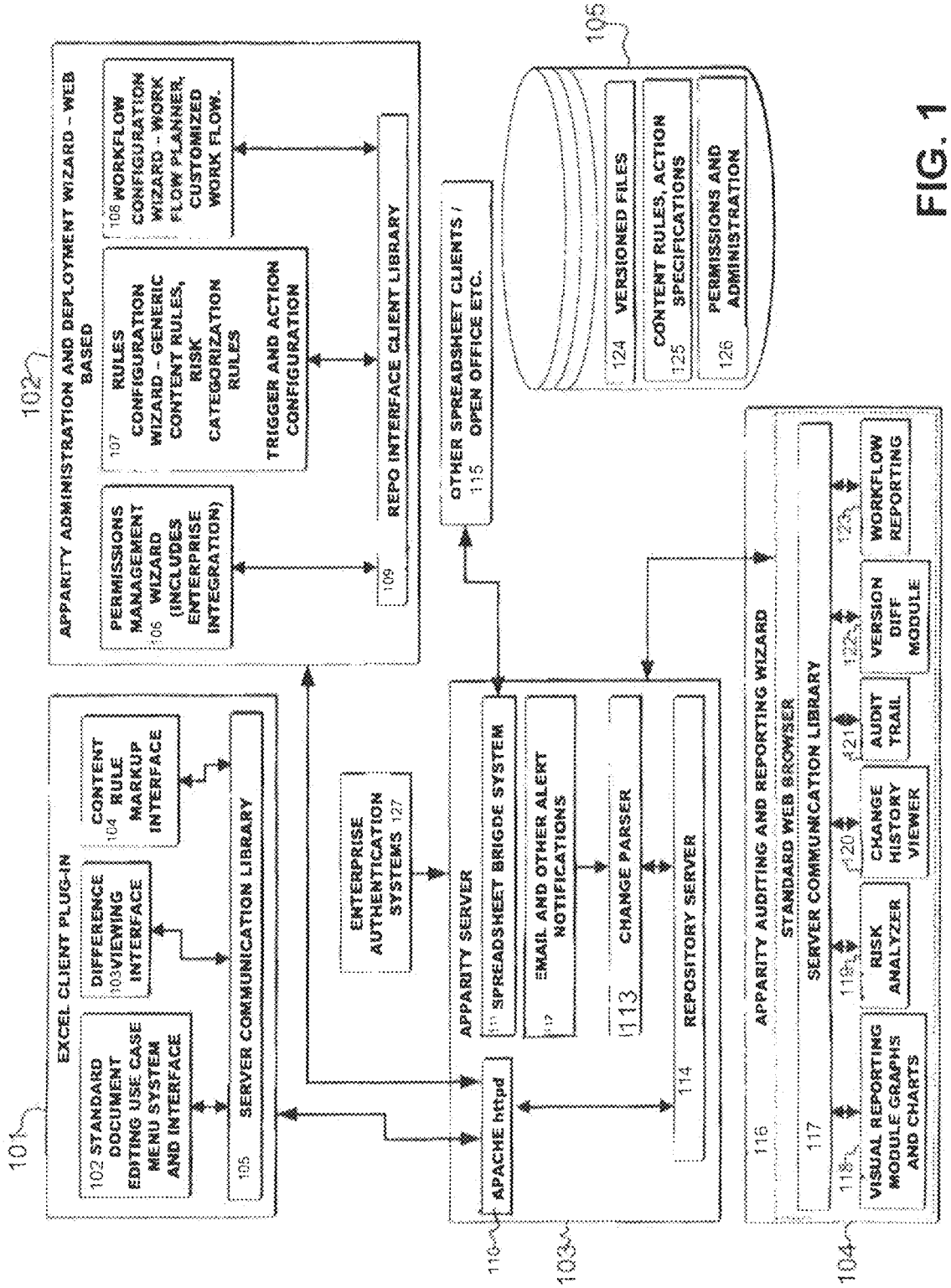
FIG. 1 depicts the overall Enterprise Process Management system of the present invention.

In general there are several problems with application level data usage, tracking, auditing, reporting and management that are not addressed by existing version tracking and auditing products or solutions:

Problem #1: The unique requirements of managing spreadsheet application file formats versus other document application file formats.

Spreadsheet application files are not like other application document files because of the complexity created by the unlimited number of interdependencies that can potentially exist between individual cells within the same spreadsheet and/or interdependencies created between cells that exist in one or more separate spreadsheets. Such interdependencies are defined in the spreadsheet at the cell level and the interdependency is typically manifest through (but not limited to) formulas, macros, embedded programs or objects, databases and calculated values.

Attempts to manage large numbers of users across multiple libraries of many tens, hundreds or even thousands of spreadsheets that contain interdependencies have failed. They have failed because the inspection processes used by document centric management systems, (for example, Enterprise Document Management systems), cannot successfully maintain a complete view of all the interdependencies that spreadsheets applications are built to support.

Common business practice has become accustomed to solving real world business problems on an individual, team, departmental and enterprise wide level extensively by utilizing the abilities and the power of cell level interdependencies between cells within a single and or between multiple spreadsheets.

Problem #2: In the business world, providing spreadsheet users with robust and scalable capabilities that can deliver reliable centralized management and control of interdependent (commonly referred to as 'Linked' or 'Related") spreadsheets.

Because of the application development capabilities of spreadsheet applications, users have the ability to build powerful complex models by leveraging the ability to establish cell level interdependencies within single and or between multiple spreadsheets. With these capabilities it is possible to develop, test and maintain effective solutions to many common business needs such as accounting and financial reporting requirements; a common example would be Multi Entity Financial Consolidation reports. However attempts to develop and maintain the data integrity of these kinds of reports have failed when the 'linked' spreadsheets that are used to maintain the reports are regularly accessed and shared by multiple users.

They have failed because users that open and/or receive spreadsheets that possess cell level interdependencies with other spreadsheets may not have the appropriate permissions to the network drive, network shared drive or storage devices that would be needed to access the linked or related content held on the dependent spreadsheet or spreadsheets stored on those shared drives and/or storage devices. Thus the ability to consistently leverage and maintain these interdependencies is compromised and as a result the integrity and reliability of the spreadsheet models dependent upon those cell level links cannot be relied upon.

Neither EDM systems, File Management Systems nor Business Process Management applications are capable of maintaining the knowledge and the integrity of all the interdependencies that can exist within either a single spreadsheet and or between multiple spreadsheets when multiple users with differing access rights/network permissions need to work on those spreadsheets.

Given the power and sophistication which is capable of being developed and harnessed by the application development capabilities of modern spreadsheets, spreadsheets have now become application development environments or tools to build custom business apps, not simple document editing tools. Thus the requirement to manage and control business processes such as Multi Entity Financial Consolidation reports that require access from users with differing permissions and rights can only be met by using a solution capable of managing a multi user application development environment. In short a solution based upon the principles and technology of Source Code Management.

Problem #3: Given the decentralized usage of spreadsheets, administrators, managers, signatory executives as well as auditors or government regulators lack the ability to understand, manage and control the complex relationship between linked spreadsheets, let alone the impact of minor changes made to any single cell within a spreadsheet.

As the users copy and share the spreadsheet outside of well-defined management tools like EDM systems, it greatly reduces the manager's ability to control and track both the behavior of a modified spreadsheet as well as see where that change will impact other spreadsheets. The usage of web-based collaboration tools or even web-based spreadsheet tools does not address nor solve the complex OO like application linking capabilities that may exist within linked spreadsheets. Thus treating the cell level contents of spreadsheet files as SCM managed source code is the way to scale the user tracking, history and change management solution.

Problem #4: People are not able to use spreadsheets on the web in the same manner as the way they do with desktop PC spreadsheet software.

Users do not like web only based spreadsheet applications, principally because they are not capable of delivering all of the sophisticated functionality, power and slick navigation that users of Excel are familiar with and demand. However, users do want to exploit the collaborative/sharing capabilities of web based/cloud applications such as Google docs. In so doing they want to be able to perform the same operations, procedures and maintain the same interdependencies that they have used with desktop spreadsheets, but then also be able to utilize the best of the web collaboration features while also being able to manage and track changes while ensuring that version control is available across all web users.

Problem #5: Spreadsheet users would like to keep track of their data within spreadsheets yet be able to collaboratively publish the content of the spreadsheet or share the data values calculated by the spreadsheet with other web users including social media tools and services.

Given that the spreadsheet is the premier tool for managing and tracking data, it is natural for users to want to keep using their familiar tools yet be able to connect the data contained within the spreadsheet to other web-based services or tools. This level of collaboration allows the user to dynamically share the new data as it is generated, created or inputted and tracked by the user, yet the viewing, usage or consumption of these data values may occur via web-pages which expose other users to the data without giving the ability to change or alter the data values.

This simple idea of user generated content being self-published by the linking of cell level spreadsheet data, that is tracked and managed using SCM technology, to the new social media tools allows the best tool to be used for each aspect of the task—content creation versus content consumption.

Thus, what is needed to solve these problems is a solution that manages the unique complexity of application level data including spreadsheets and their application like behavior, yet which can scale to meet the needs of many thousands of users and groups of users and which is able to operate across both an "On Premise" (within an enterprise) and cloud based mode as well as in a "hybrid" mode supporting features and aspects of users working in both modes.

In one embodiment, a solution to these and other problems is to embed a sophisticated spreadsheet or application management client process natively within a spreadsheet to extend or control the data input and output process of the spreadsheet via integration with a separate SCM server process, to create a centralized and scalable Enterprise Process Management (EPM) service. The creation of this new EPM software application enables users, administrators, auditors, managers, executives or any user to gain confidence in controlling who did what, when, where and how to any spreadsheet, as well as to see how any change may interact or ripple through the entire set of related or interdependent spreadsheets that are managed by the EPM service. In addition the EPM application will enable a complete set of auditing, reporting and administration over users and their access to spreadsheets and possess the ability to open, read, modify or save any file.

Further it should be noted that the services and capabilities of the EPM are not limited to just working with spreadsheets, but in general the invention may be adapted to work with the output of any software application or category of applications and provide control over user editing and collaboration process.

Some specific EPM invention features or examples include:

- Recognition that simple application data file comparison tools or models will not work and that each and every complex document such as spreadsheets may be unique 'applications' and should be managed accordingly. An effective and scalable solution to managing many thousands of unique but often related applications data files is a Source Control Management (SCM) System. This invention may utilize the principles of SCM to handle the cell level source code nature of every grid or matrix modeled within a spreadsheet. For example, formulas, macros, add-ins, pivot tables—these may all be embedded within a cell, range of cell or worksheet, and these all behave like object code that is interpreted at runtime by the spreadsheet much like a dynamic interpreted software development tool.
- Recognition that spreadsheets users want to work natively within their spreadsheet in order to harness all of the existing power and capabilities they are used to using while also having the spreadsheet application (local client PC software or cloud based app) connected to a complete version tracking, control and management solution. This natively embedded but seamless or unobtrusive model of working is preferable to eliminate deployment, training and operational issues as well as ensure continued usage of the existing and newly created spreadsheets within the management framework, which provides the auditing, control and management framework. Typically this may be provided as a vendor native 'plug-in' or extension type of software add-in within the spreadsheet application, but may also be provided as a web-service add-on model, or in other ways.
- Recognition that spreadsheet cells are essentially source code document repositories—that is, any cell may contain constants, calculated values, formulas, macros or functions or entire programs or other complex objects such as charts or graphs etc. Each cell may be viewed as a source code document within the grid which may be managed in a manner consistent with known Source Code Management (SCM) systems methods. The invention may utilize a native spreadsheet extension or plug-in tool to integrate within a spreadsheet client which then is linked to or connected to or bound to the SCM like process, to allow the process to extract cell level content and stream it into or out of the EPM process. Instead of utilizing the native file I/O or document storage model of the spreadsheet, the EPM invention extracts cell level content and streams it into an SCM process for management and enhanced control over the auditing, tracking and reporting process for spreadsheet usage, changes and monitoring among other features.
- The solution allows authenticated or logged in users to open up spreadsheets under its control to be recreated within the spreadsheet's file open functionality. The add-in communicates with the SCM service and requests the specified 'file', including version, date or level of the desired spreadsheet, and loads the requested cell data into the spreadsheet as an opened spreadsheet file. Once loaded into memory the user may continue to work with the spreadsheet in a normal manner and utilize all native and built-in features of the spreadsheet tool including making any desired changes, enhancements or inspections of the spreadsheet content. Once the user is finished doing their work, they may choose to discard their work or save their work, in which case they may use the add-in to perform a 'file save' operation that would reverse the process and stream the cell data back into the SCM process.
- The invention may utilize the plug-in or extension model to integrate itself seamlessly into the spreadsheet user's experience while maintaining native control over the file input/output process and data import and export process of any and all cell level data, including worksheet and workbook wide level data. The invention leverages the spreadsheet for access to and control over the data while integrating the SCM like process to leverage its ability to track native source code cell level data contained within the spreadsheet.
- Thus the present invention may integrate the two distinct worlds of desktop or PC spreadsheet applications with the native data management capabilities of the SCM services along with other workflow and document management processes to provide unique and distinctive auditing, tracking, reporting and control of any document. This detailed tracking may include spreadsheet level changes made by any user opening, accessing or modifying any aspect of the spreadsheet, while centralizing administration of application processes, reporting and monitoring.
- Recognition that administrators, managers, executives as well as outside consultants, CPA's, auditors or regulators among many others want to have a complete picture of who accessed which file and when, but also what they did to the file as well as how that change relates to other users, other files or other outcomes which depend on that file. These users need complete reporting and monitoring over the users, their activity and the approval or workflow related to the work they do with the managed.
- Spreadsheets are also the 'Point of Collaboration'— within both a business as well as within a casual community of users. The present invention recognizes the unique linking, sharing and collaboration aspect of spreadsheets and may use the built in 'collaborative' functionality of a Source Code Management system to optimize/improve/enhance the ability for multiple (disconnected/disparate) users to work with a set of shared spreadsheets which are managed within the framework, while providing enhanced auditing, tracking, control and management solutions. Thus the security and control provided by this invention enable and support enhanced collaboration capabilities or features between spreadsheet users while working seamlessly and unobtrusively within the spreadsheet. Thus enhanced management and control features are enabled to allow managers, administrators, executives or outside auditors/consultants to coordinate, lockdown or control how users work with spreadsheets and work together sharing the same sets and versions of spreadsheets, including working with multiple versions of the same file in a seamless and coordinated manner.

Utilizing a separate server based SCM model to manage spreadsheet content allows the invention to build out a unique architecture that enables users to continue using their existing Excel desktop application and still leverage all the benefits of the sharing and collaboration of file based approaches. The SCM model minimizes I/O volume to the server, guarantees all the benefits of Web Based spreadsheets, (i.e. remote storage, versioning, restores and sharing) yet allows the user to build, share and manage extremely complex spreadsheets and/or groups of related spreadsheets with an unlimited number of 'collaborators', while enabling managers or administrators to track, audit and report on all usage interactions. The SCM server may be located onsite within an internal network managed by an enterprise (i.e. behind the corporate firewall) or it may be located in a privately secured internet cloud or within a public cloud—the choice of deployment and management of the auditing, tracking and control backend service is one of security, affordability, packaging and user choice, as the invention supports all models and combinations of models.

A cloud based SCM like model that leverages the local PC Excel client application—i.e. the hybrid model—not only solves the 'adoption' challenge of web-based/cloud based spreadsheet applications—it provides a unique model for 'bridging' the two worlds. The solution is able to synchronize the activity/output of the desktop (Fat or Rich Client) apps with the cloud based web apps. This unique architecture allows the user to 'work in the cloud' within the desktop apps which they are familiar with and prefer, while providing the cloud vendors with a unique and user friendly 'path' to getting users to work in the cloud. This bridging solution provides the cloud vendor with a unique insight into how the spreadsheet (e.g. Excel) user wants to work in the cloud, and provides an invaluable tool to adjust and refine their Cloud offerings—to ultimately provide users with an experience that rivals the Desktop fat client application experience.

The unique hybrid 'On-Premise/Cloud' solution offers businesses a new and unique approach to managing spreadsheets that are accessed, amended, reviewed and used by related users working for the same or possibly different company, but requiring instant, secure and up to date access to their spreadsheets. The SCM engine guarantees the accuracy and collaboration, and the architecture means it can be available inside and outside of the Enterprise firewall.

The overall Enterprise Process Management (EPM) system and its architecture or design is described in the included figures starting with FIG. 1, which defines an EPM service from a high level or overview perspective. In one embodiment, the system comprises a client side Plug-In component (101), an EPM Server component (103) which manages, processes and stores data regarding file versions and other information tracked by the system, as well as an Administration (102) and Reporting Service (104) to allow reports to be generated for information requested by various users, roles, rules or automated tasks. The EPM Server may include support for integration with Enterprise Authentication Systems (127) including support for the LDAP protocol, a webserver or HTTP daemon (110) or services, an Application or Spreadsheet Bridge System (111), and Email and Alert Notification system (112), and a Change Parser (113) to analyze data or metadata stored in the Repository or Versioned File storage system (124). Communication of information flows between the various modules may be achieved using a variety of protocols configurable by the administrator or stored directly within the systems data storage modules.

The client side plug-in module (101) integrates with the UI of the spreadsheet (205) or application and allows users to open, save and process data or files that are stored within the system or will be stored by the system. Administration of the system is preferably via a web browser interface which is used to set various rules, settings and configurations that drive the operation of the system and the various modules. The system data may be stored or managed in a set of Versioned Files (124) via a set of Content Rules, Actions and Specifications (125) stored by the system. The system may also include a full and complete security capability with Permissions and Administration (106) settings for users, files, objects and roles. The Auditing and Reporting Wizard (116) can be driven by the Visual Reporting Module (118), the Risk Analyzer (119), the Change or History Viewer (120), the Audit Trail (121), the Version Difference Module (122) as well as the Workflow Reporting modules.(123)

Figure 2:
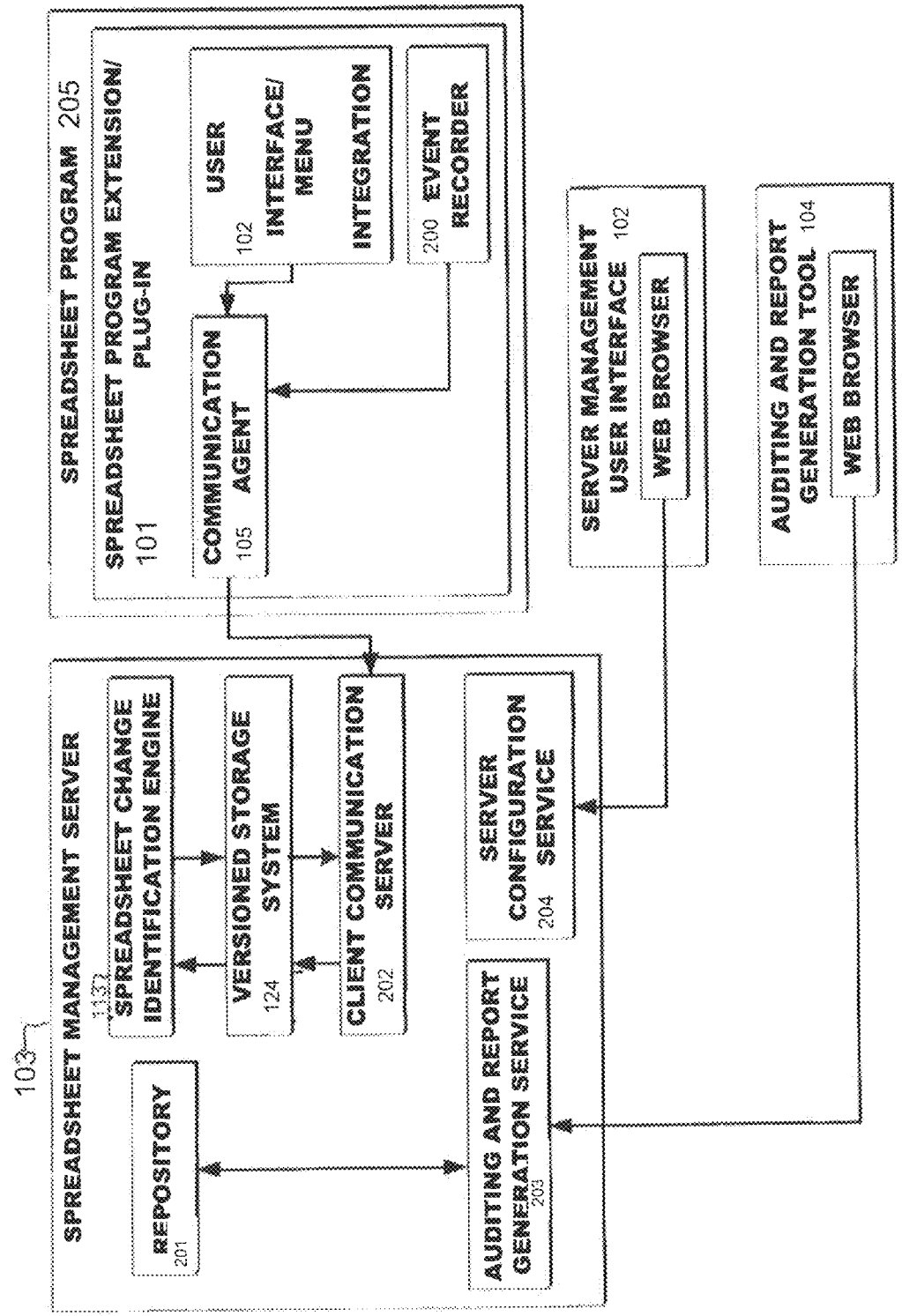
FIG. 2 illustrates the communication flow between various elements of the present invention.

FIG. 2 describes the communication flow between various elements of the solution, in one embodiment, including the client helper object and various components of the server. Portions of functionality of the spreadsheet Plug-In or helper object (101) including the Spreadsheet Change Identification module (113) may also be implemented on the server. The Spreadsheet Change Identification module (113) receives input from the application via the Communication Agent modules (105) and runs rules against the content stored in the Versioned Storage System (124) as well as the metadata describing the content to identify what actions to take including alerting or communicating. The Versioned Storage System (124) provides version tracking and storage services to the system including the ability to store and retrieve data from the Repository (201) as well as store and retrieve data or portions of the data or metadata and summarized data or statistics. The stored information is received from the communication requests from various system elements. The Client Communication Server (202) processes input received from the client or application plug-in generated by the client side Communication Agent (105) over the configurable protocol and passes the information received to the versioning storage system. (124) The Auditing and Report Generation service (203) allows the system to respond to requests for specific data and may utilize the versioned or history data as well as metadata or statistics to determine the proper response to these requests and generate appropriate responses including specifically requested data in specific formats. The Server Configuration and management Service (204) allows users of all types including system administrators to define how the various subsystems work or perform as well as configure the rules, alerts and communication aspects of the various system components. The Server Management UI (102) module provides a web browser interface to manage and configure the Server Configuration Service (204). The Auditing and Report Generation Tool (104) provides a web browser interface to manage and configure the Auditing and Report Generation Service (203). On the application or client side, the Plug-In module (101) provides a UI experience by integrating into and extending the native UI of the application. The Plug-In module (101) also includes an Event Recorder module (200) to record system events and user interactions which passes the event data to the Communication Agent (105) for transmission to the server side processes.

FIG. 3

Figure 3:
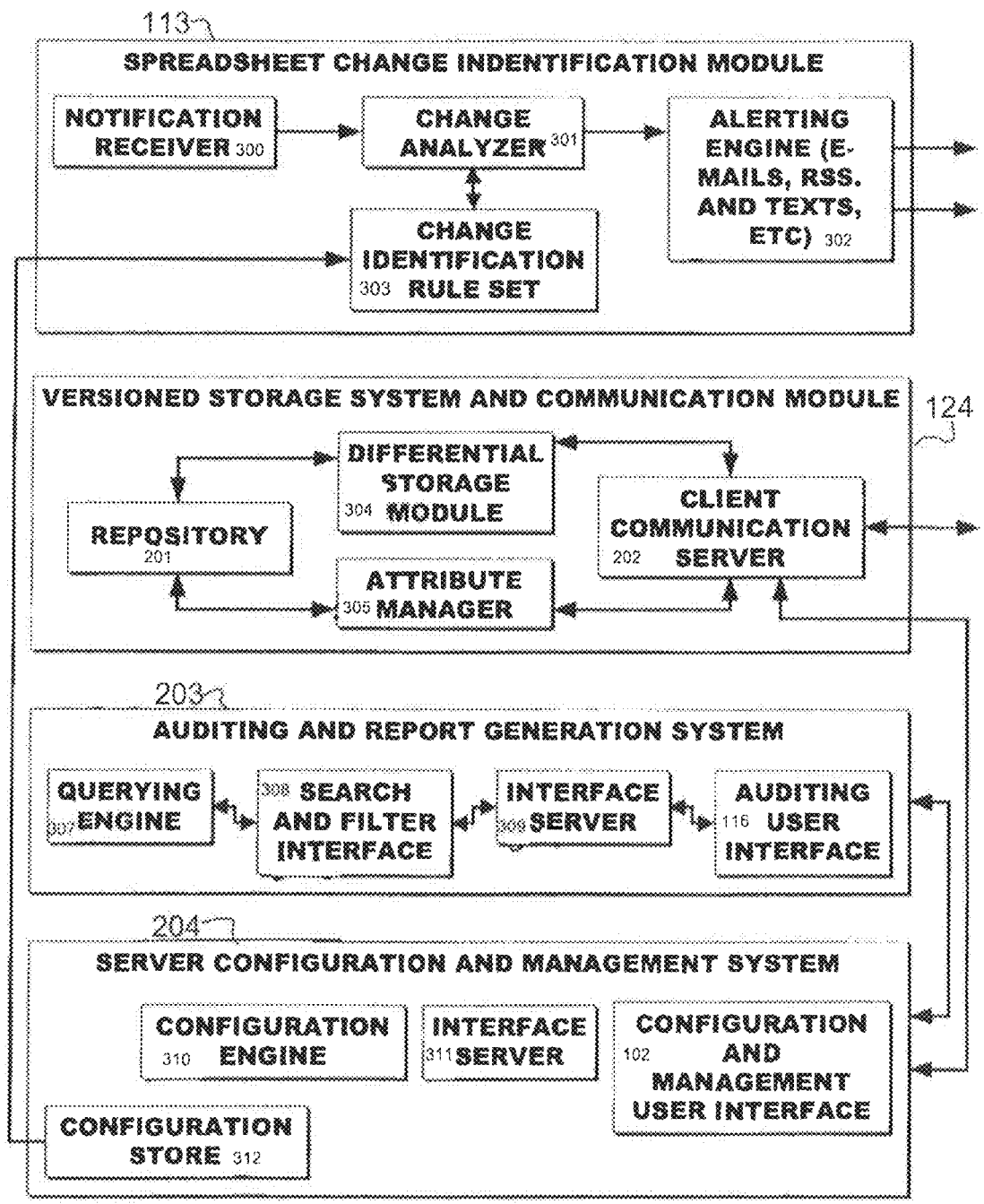
FIG. 3 describes the various components of the present invention that interact with users of the software applications.

FIG. 3 describes in one embodiment the various components of the system that interact with users of the software applications, including spreadsheet users, as well as the functions of the helper object that records various actions of the user, their interaction with the software application as well as the software applications events or actions. One important aspect of user interaction is the ability to integrate with the software application or environment's native security system for a 'single sign-on' or authentication system, which allows a user to sign into the EPM versioning and tracking system using their existing corporate administrator issued security id or token and password. This integrated security model enables users of the system to control user access to files, reports, communication services, including sign-off and verification of approved changes or workflow processing using attributes, roles and identities setup and secured by a centralized security authority. The Spreadsheet or Application Change Identification Module (113) receives Notifications (300) from the application, passes them through the Change Analyzer (301) using the Change Identification Rule Set (303) which may be retrieved by the server side Configuration and Management System (204), and pass any data meeting the criteria or rules on to the Alerting Engine. (302) The Versioned Storage System (124) and Communication Module manage the data, metadata or information tracked by the system using a Repository (201) to store the system information. The Differential Storage Module (304) receives requests from the Client Communication Server (202) and processes the requests against the Repository (201) to determine which data meets the request, and then passes the data back to the requesting process via the Communication Server (202). The Auditing and Report Generation System (203) includes a Query Engine (307) to process requests, a Search and Filter Interface (308) to modify or build queries or requests as well as an Interface Server (309) which allows the users or system modules to generate or make requests via the Auditing User Interface (UI) (116). The Server Configuration and Management System (204) provides control over the various settings, roles, rules or characteristics that may govern the system performance or behavior including security access. The Configuration engine (310) stores and retrieves configuration settings via the Interface Server (311) while the Configuration and Management User Interface (102) presents a way for users to interact with the server or processes to determine how the system operates.

FIG. 4

Figure 4:
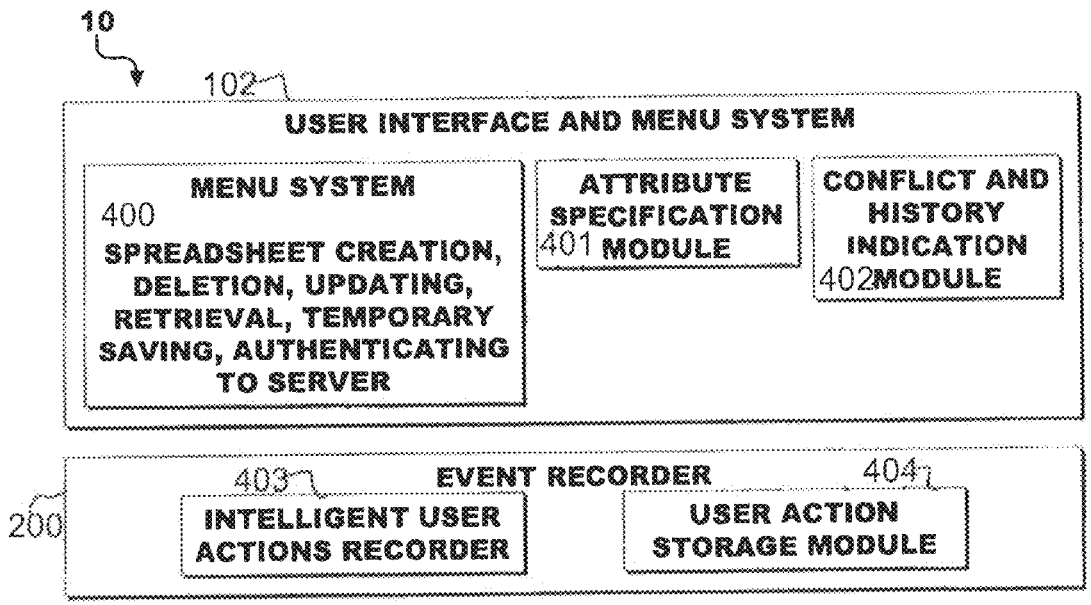
FIG. 4 depicts the user interface and menu system, as well as the flow of information.

FIG. 4 describes in one embodiment the user interface and menu system,(102), as well as the flow of information between user login or authentication and the resulting system functionality or responses enabled by their currently known security level or role. All user interaction may be governed by security policies, rules or configuration settings that first check to see if the user has the appropriate level of authority, access or privileges and the like to perform the requested action. Additionally, user interaction may be monitored by the system to enable automated or triggered actions or alerts to be communicated or sent to approved receivers based on the security level of the user, their actions and the data they are working with, and the types of changes that they may be making to the data. Various administrator or system level configuration settings, rules or policies may be configured to enforce actions, block activity or changes to data, as well as notify or alert others that certain changes and or activities have occurred, or actions taken or not taken or blocked among other system tracked or managed objects, files, data elements or reports and the like. The Menu System (400) plugin exposes a menu system by which the user is allowed to access common server and managed spreadsheet operations including, but not limited to spreadsheet creation, deletion, updating, retrieval, and save. The Attribute Specification Module (401) allows a user to use a graphical interface to specify attributes associated with the spreadsheet. These may be custom properties, such as comments or identification tags. The Conflict and History Identification Module (402) allows the user to graphically peruse the change history of a managed spreadsheet in chronological order. It also allows the user to sort changes based on the author or a range of dates. The Event Recorder's (200) main purpose is to store user actions metadata for a session. This metadata is stored along with the file change history. This allows contextual parsing of changes and more accurate identification of nature of changes by user. For example, in an 8 row, 4 column spreadsheet, deleting a row may be viewed as the modification of top 7 rows, with the 8th row changed to be blank. However this is more usefully interpreted as deletion of row 1 and can be accurately done with the contextual information provided by user actions.

FIG. 5

Figure 5:
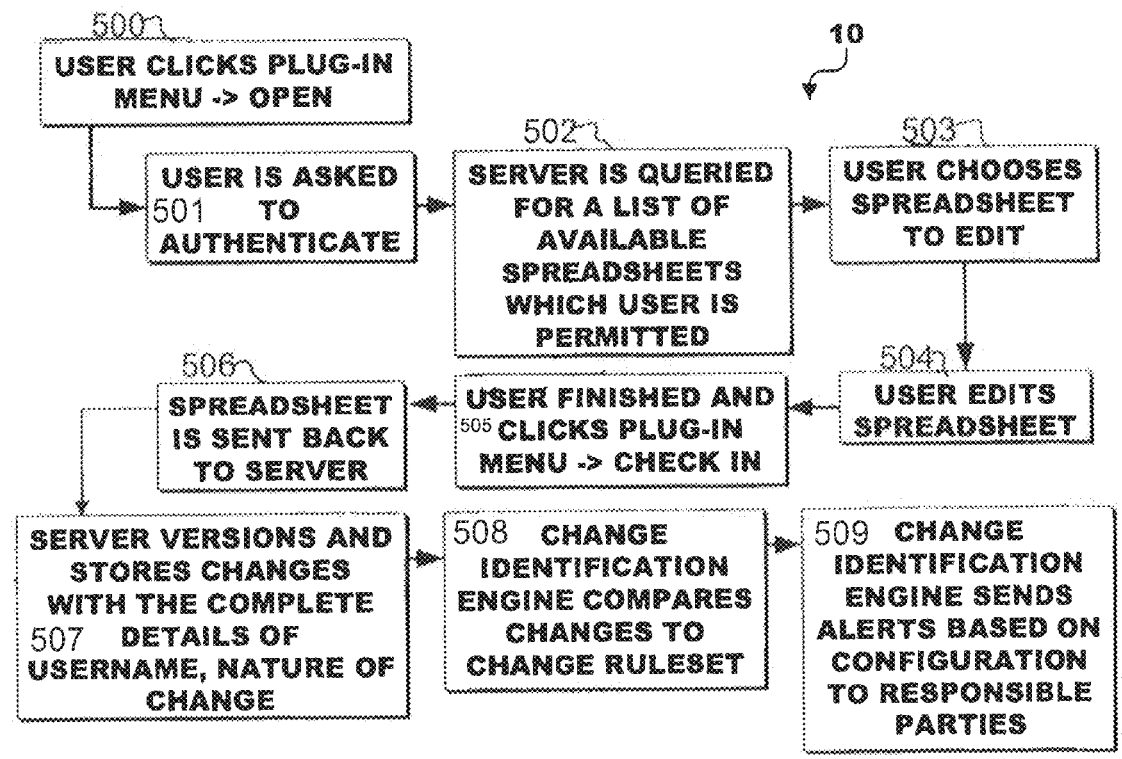
FIG. 5 depicts the present invention including user interaction with software application plug-ins.

FIG. 5 describes in one embodiment a high level overview of the system including user interaction with software application plug-ins including Excel or spreadsheet plugins, various user reporting services which generate summaries of data, users and overall system interaction, as well as the server side components including the administration module and configuration system. This figure illustrates the data and control flow through various parts of the present system. For example:

1) The user initiates operation by Clicking Open on the Plugin Menu (500)
2) if the user has not already authenticated he is asked to authenticate (501)
3) The plugin (101) enumerates spreadsheets, displaying only those the user is allowed to access (502)
4) The user can only pick from the spreadsheets he is allowed to access
5) User edits spreadsheet normally (503)
6) User finishes editing and then clicks the Check-in menu option to indicate he would like to finalize his changes and store them in the server as a uniquely identifiable version(505)
7) Spreadsheet is sent back to the server via the network (506)
8) Server stores the changes as a differential over the last version. This reduces space required to store data (507)

9) Change identification engine (113) analyzes changes to see if Events of Interests have occurred, like Formula Changes or specific cell changes (509)

Figure 6:
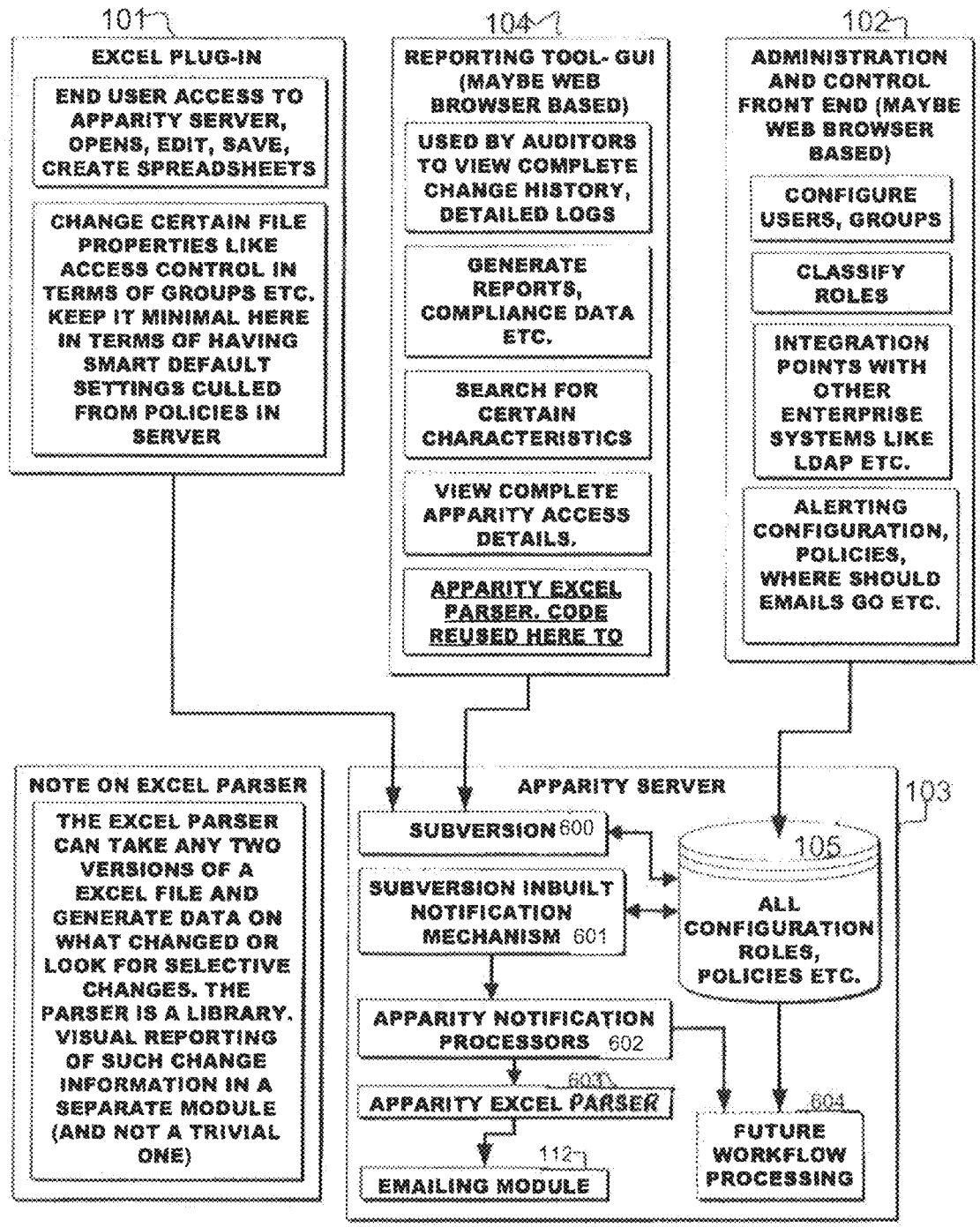
FIG. 6 describes a more detailed view of the depiction of the present invention in FIG. 5.

10) Change identification engine (113) sends change notification to interested subscribers FIG. 6

FIG. 6 describes in one embodiment a more detailed view of the system beyond the level documented by FIG. 5, and describes additional system layers and services. These layers define how the software may be designed, configured or operated or deployed in various configurations and under various operating roles or functionality. The communication flow shown between modules is only approximate and should not be used to limit the overall design or communication potential of future systems. This figure indicates the various components of the overall solution, as described below.

Apparity Server Block (103)
    Subversion (600): The server is responsible for storing all revised or tracked file data using SCM system
    Configuration (105): All configuration information such as permissions, user roles etc. are centrally stored on the server.
    Inbuilt notification mechanism (601): This is the hook provided by SCM implementations to notify anybody subscribing of any change to any part of the repository, like addition of files, deletion of files, modification of files.
    Notification Processor (602): The notification processor subscribes to the inbuilt notification system of subversion and then sends alerts and notifications to individual users watching for changes. It does this based on preferences.
    Excel Parser (603): The Excel parser is the Excel file specific extension that analyzes the changeset—i.e it analyzes the differences then checks these changes to see if any of the currently set subscription rules match this. For example: a formula changes and then decides to take action.
    Email Module (112): The emailing module implements the email sending functionality when notifications need to be sent out.

Administration and Control Front end (102)
    Configure User Groups: Allows administrators to create users and assign them to groups.
    Classify Roles: Allows administrator to classify various types of roles within the organization that users may perform.
    Integration Point with LDAP: This allows integrating with organizational infrastructure like LDAP to enable single sign on mechanisms.
    Alerting Configuration and Policies: Allows configuration of alert policies and mechanisms.

Reporting Tool
    View Change Logs: The reporting tool is sued by Auditors to graphically and textually view complete change logs and history for analysis.
    Generate Compliance Reports: Allows generation and publishing of compliance reports and audit summaries.
    Searchability: Allows searching for particular events
    Excel Parser: Used to retroactively generate and view Events of Interest Excel Plugin
    The plugin acts as the front end for regular users to operate with spreadsheets managed by the repository.
    End User operations: The plugin implements regular end user operations dealing with spreadsheets like open, close, etc.

It should be apparent to those skilled in the art of computer software, hardware and networking technology that these concepts may be expressed in many equivalent forms and methods to those described within this document and all of which should be seen to be covered by this application. Any linking of desktop applications to network, Internet or cloud based services will require network access interfaces. Network interfaces may include, for example, an Ethernet adapter (e.g., 10BaseT, Fast Ethernet, Gigabit Ethernet) or a wireless local area network (WLAN) adapter (e.g., 802.11a/b/g). The network interfaces may include address, control, and/or data connections to enable appropriate communications on the network. A data store may be used to store data, such as various DOCs from the users and all of the metadata associated with each spreadsheet or document or file stored in the system. The data store may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store may incorporate electronic, magnetic, optical, and/or other types of storage media. In one example, the data store may be located internal to the server such as, for example, an internal hard drive connected to the local interface in the server. Additionally in another embodiment, the data store may be located external to the server such as, for example, an external hard drive connected to the I/O interfaces (e.g., SCSI or USB connection). In yet another embodiment, the data store may be connected to the server through a network, such as, for example, a network attached file server. Also, the data store may include combinations of these various embodiments.

The memory may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory may incorporate electronic, magnetic, optical, and/or other types of storage media. Note that the memory may have a distributed architecture, where various components are situated remotely from one another, but can be accessed by the processor. The software in memory may include one or more software programs, each of which includes an ordered listing of executable instructions for implementing logical functions. The software in memory includes a suitable operating system (O/S) and various programs. The operating system essentially controls the execution of other computer programs, such as the various programs, and provides scheduling, input-output control, file and data management, memory management, and communication control and related services. The operating system may be any of Windows NT, Windows 2000, Windows XP, Windows Vista, Windows 7, Windows 8 and all versions of Windows Server 2003/2008 (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C.), or the like. The various programs include logic for executing the various processes described herein with respect to the spreadsheets, documents, webpages or web-services and the like.

Although the present inventions have been illustrated and described herein with reference to certain embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

The invention claimed is:

1. A computer-implemented method for tracking spreadsheet application data, comprising executing on a processor the steps of:
    receiving a first communication from a network interface, the first communication comprising a first content of a cell of a native spreadsheet from an embedded tracking object within a native spreadsheet application on a client device, the embedded tracking object extracting the first content from the cell of the native spreadsheet, the first content including grid data identifying the cell;
    saving the first communication in a non-transitory computer storage remote from the client device;
    receiving a second communication from the network interface, the second communication comprising a second content of the cell of the native spreadsheet from the embedded tracking object within the native spreadsheet application on the client device, the embedded tracking object extracting the second content from the cell of the native spreadsheet, the content including the grid data identifying the cell;
    storing the changes in the cell between the first content and the second content, wherein the storing comprises:
        performing a difference operation on the first content and the second content for the cell, to produce a cell level change data, and
        saving the cell level change data to the non-transitory computer storage remote from the client device, only if the cell has changed between the first content and the second content; and
    generating a selected spreadsheet, wherein the generating step comprises:
        selecting a partial subset of the cell level change data, and
        merging the selected partial subset of the cell level change data into the first content to assemble the selected spreadsheet.

2. The method of claim 1, further comprising the steps of:
    i. detecting whether a selected type of change has occurred between the first content of the cell of the native spreadsheet and the second content of the cell of the native spreadsheet: and
    ii. generating an event if the selected type of change has been detected.

3. The method of claim 2, wherein the event comprises sending an email alert to a selected recipient.

4. The method of claim 2, wherein the event comprises sending a text alert to a selected recipient.

5. The method of claim 2, wherein the event comprises posting an alert to a social media site.

6. The method of claim 1, further comprising generating a report associated with the cell level change data.

7. The method of claim 1, further comprising performing an audit function on the cell level change data.

8. A system for tracking spreadsheet application cell data, the system comprising:
    a spreadsheet client device comprising:
        a network interface, and
        a native spreadsheet application comprising an embedded tracking object,
        wherein the embedded tracking object is configured to extract a first content of a native spreadsheet cell and transmit the first content via the network interface to a spreadsheet revision server, the first content including metadata identifying the cell, and extract a second content of the native spreadsheet cell and transmit the second content via the network interface to the spreadsheet revision server, wherein the second content contains a modification of the first content and the metadata identifying the cell; and
    the spreadsheet revision tracker server remote from the client device, the spreadsheet revisions tracker server comprising:
        a network interface,
        a non-transitory computer storage medium, and
        a spreadsheet revision tracking application configured to:
            receive the first content from a network interface,
            save the first content in a non-transitory computer storage,
            receive the second content from the network interface,
            store the changes in the cell, identified by the metadata, between the first content and the second content, wherein the storing comprises:
                performing a difference operation on the first content and the second content for the cell, to produce a cell level change data, and
                saving the cell level change data to the non-transitory computer storage, only if the cell has changed between the first content and the second content, and
            generate a selected spreadsheet, wherein the generating step comprises:
                selecting a partial subset of the cell level change data, and
                merging the selected partial subset of the cell level change data into the first content to assemble the selected spreadsheet.

9. The system of claim 8, wherein the spreadsheet revision tracking application is further configured to:
    i. detect whether a selected type of change has occurred between the first content of the cell of the native spreadsheet and the second content of the cell of the native spreadsheet; and
    ii. generate an event if the selected type of change has been detected.

10. The system of claim 9, wherein the event comprises sending an email alert to a selected recipient.

11. The system of claim 9, wherein the event comprises sending a text alert to a selected recipient.

12. The system of claim 9, wherein the event comprises posting an alert to a social media site.

13. The system of claim 8, wherein the spreadsheet revision tracking application is further configured to generate a report associated with the cell level change data, identifying the cell from the metadata.

14. The system of claim 8, wherein the spreadsheet revision tracking application is further configured to perform an audit function on the cell level change data.

15. The system of claim 8, wherein selecting the set of the cell level change data is performed using a graphical merge user interface.

16. The system of claim 8, wherein selecting the set of the cell level change data further comprises rejecting the cell level change data.

17. The system of claim 8, wherein the spreadsheet revision tracking application is further configured to transmit the selected spreadsheet to a spreadsheet client device.

18. The system of claim 8, wherein the native spreadsheet application comprising the embedded tracking object is configured to extract the first content when the user selects to save the native spreadsheet.

19. The system of claim 8, wherein the native spreadsheet application comprising the embedded tracking object is configured to extract the second content when the user selects to save the native spreadsheet.

20. A non-transitory computer-readable medium for tracking spreadsheet application cell data, comprising instructions stored thereon, that when executed on a processor, perform the steps of:

receiving a first communication from a network interface, the first communication comprising a first content of a cell of a native spreadsheet from an embedded tracking object within a native spreadsheet application operating on a client device remote from the non-transitory computer readable medium, the first content including source code cell data identifying the cell;

saving the first communication in a non-transitory computer storage remote from the client device;

receiving a second communication from the network interface, the second communication comprising a second content of the cell of the native spreadsheet from the embedded tracking object within the native spreadsheet application operating on the client device, the second content the source code cell data identifying the cell:

storing the changes in the cell between the first content and the second content, wherein the storing comprises:

performing a difference operation on the first content and the second content for the cell, to produce a cell level change data, and saving the at least one cell level change data to the non-transitory computer storage, only if the cell has changed between the first content and the second content; and generating a selected spreadsheet, wherein the generating step comprises:

selecting a partial subset of the cell level change data, and merging the selected partial subset of the cell level change data into the first content to assemble the selected spreadsheet in the cell identified by the source code cell data.

21. The method of claim 1, wherein the grid data further defines interdependences of the cell with other cells in the spreadsheet.

22. The system for tracking spreadsheet application cell data of claim 8, wherein the metadata further defines interdependences of the cell with other cells in the spreadsheet.

23. The non-transitory computer-readable medium of claim 20, wherein the source code cell data further defines interdependencies of the cell with other cells in the spreadsheet.

* * * * *